K. DINGERTZ.
TRUCK FOR RAILROAD CARS AND THE LIKE.
APPLICATION FILED MAY 13, 1913.

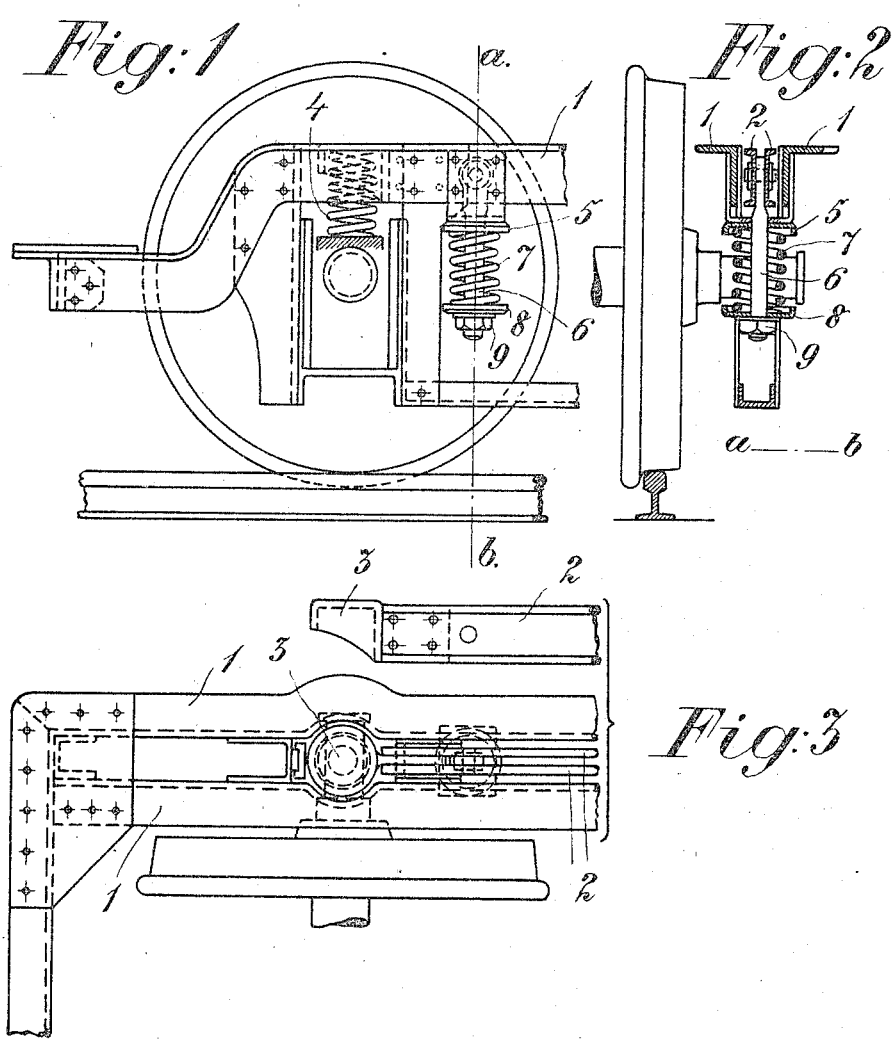

1,168,714.

Patented Jan. 18, 1916.
2 SHEETS—SHEET 2.

Witnesses:
John Murtagh
H. Hogg.

Inventor:
Karl Dingertz
by Goebel & Goebel
Attorneys.

UNITED STATES PATENT OFFICE.

KARL DINGERTZ, OF ARLÖF, SWEDEN.

TRUCK FOR RAILROAD-CARS AND THE LIKE.

1,168,714.
Specification of Letters Patent.
Patented Jan. 18, 1916.

Application filed May 13, 1913. Serial No. 767,264.

*To all whom it may concern:*

Be it known that I, KARL DINGERTZ, subject of the King of Sweden, and residing at Arlöf, Sweden, have invented certain new and useful Improvements in Trucks for Railroad-Cars and the like, of which the following is a specification.

In ordinary car trucks with four or more wheels the truck frame is generally supported by springs of one type or another placed directly between the frame and the axle boxes. The car truck can also be provided with equalizers resting directly on the axle boxes and by means of springs connected with the truck frame upon which the car body rests by means of springs. Through these arrangements however the jolting of the car on account of irregularities of the track and the like is only partly obviated and besides the different parts of the truck are subjected to a great strain through the continuous jolting and the shocks.

The object of this invention is to remedy these inconveniences by means of springs or the like placed directly between the ends of the equalizers and the axle boxes while the truck frame is suspended on the equalizer by means of springs.

By my invention the joltings and shocks from the irregularities of the track and the joltings on account of the lateral motion in curves and the like are eliminated by different devices, as the equalizers and springs carrying the equalizers are not influenced by the lateral motion, the brake mechanism or the like.

The invention is illustrated on the accompanying drawings.

Figure 4:
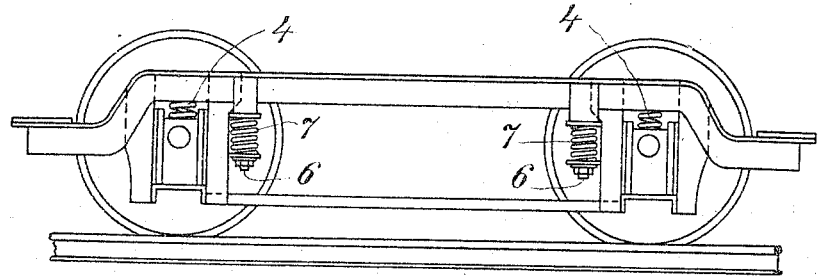
Figure 5:
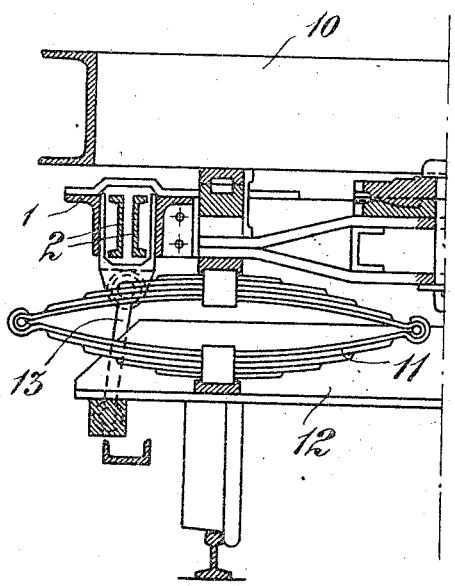

Figure 1 shows one end of the truck in elevation, Fig. 2 is a section through *a—b* in Fig. 1, and Fig. 3 shows a plan view of the arrangement and also the end of the equalizer in elevation. Fig. 4 shows the whole truck in elevation in a smaller scale and Fig. 5 shows the swinging bolster by means of which the car body is suspended.

The car body rests in the usual way upon the frame 1 by means of the cross bar 10 the ends of which rest upon the plate springs 11. These latter plate springs 11 rest upon a beam 12 which is supported in the frame 1 by means of the link bars 13. The side pieces of the frame 1 may be made of two special shaped bars placed alongside of each other between which the equalizer 2 is arranged. The upper side of the equalizer is consequently placed on a level with the frame 1 and at its ends it is shaped into caps 3 placed right over the center of the journal and here resting upon suitable springs 4 arranged directly between the boxes and the ends of the equalizers which furnish the primary point of suspension upon the axle-boxes. Inside of these springs and close to the boxes the frame 1 is supported by the equalizers, in this case by means of intermediate springs 7 which are connected with the equalizer and frame by bolts 6, washers 5, 8 and nuts 9. Thus, as shown in Figs. 1, 2 and 3, the equalizer is attached to the axle-boxes by the springs 4. Each end of the equalizer has a bolt 6 fixed thereto, the lower end of the bolt having a washer 8 which rests upon the lower end of the spring 7. The equalizer 2 and the frame 1 are thus connected by the spring 7. By this arrangement the frame 1 is elastically supported by the springs 7 which are suspended from the equalizers and these latter in their turn rest on the springs placed upon the boxes. As the equalizers are arranged between the two frame bars and the springs on the boxes placed inside the caps on the ends of the equalizers it is impossible for the equalizers to project above the upper parts of the frame, though they rest upon the springs, and consequently the car body may be placed just as low and near the track with this design of truck as when the ordinary types are used.

Of course, the different details may be arranged in many different ways without the invention thereby losing its character, *i. e.* the arrangement of springs or the like placed directly between the axle boxes and the equalizers.

I claim:

1. In car-trucks, the combination of equalizers, springs directly between said equalizers and the axle-boxes of said trucks, the frame of said trucks being composed of parallel members between which the equalizers are arranged, the ends of the equalizers resting against said springs placed directly between said equalizers and said axle-boxes.

2. In car-trucks, the combination of equalizers, springs intermediate said equalizers and the axle-boxes of said trucks, a truck-frame, said truck-frame being connected to said equalizers by springs, the side parts of said truck-frame consisting of parallel members between which the equalizers are arranged, the ends of said equalizers being formed into caps.

3. In trucks for railroad cars and the like, the combination of a cross-bar, a beam, springs directly between and connected with said beam and said cross-bar, equalizers, a link connecting said beam and said equalizers, axle boxes, and springs between and fastened to said equalizers and the axle boxes of said trucks, and a truck-frame connected to said equalizers, said springs intermediate said equalizers and said axle boxes bearing the entire weight of said equalizers and of said truck-frame, said equalizers oscillating freely on said springs.

In testimony that I claim the foregoing as my invention I have signed my name in presence of two subscribing witnesses.

KARL DINGERTZ.

Witnesses:
E. HEDENSKY,
A. LARSON.